Dec. 26, 1967  B. E. OLSON  3,359,817
GEAR CHANGE MECHANISM
Filed June 17, 1965  3 Sheets-Sheet 1

Inventor:-
Bernard E. Olson.
By Hofgren, Wegner, Allen, Stellman & McCord.
Attys.

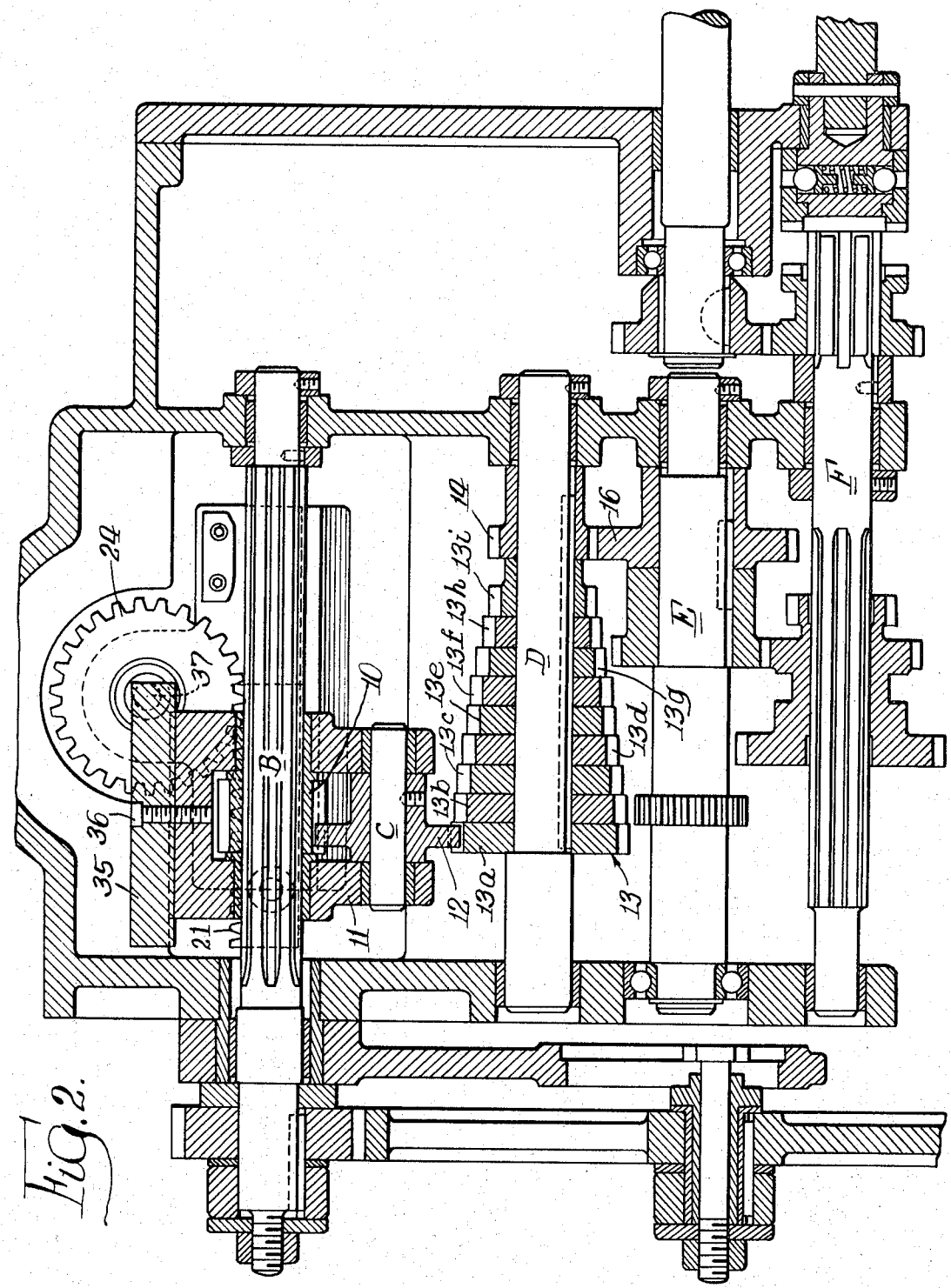

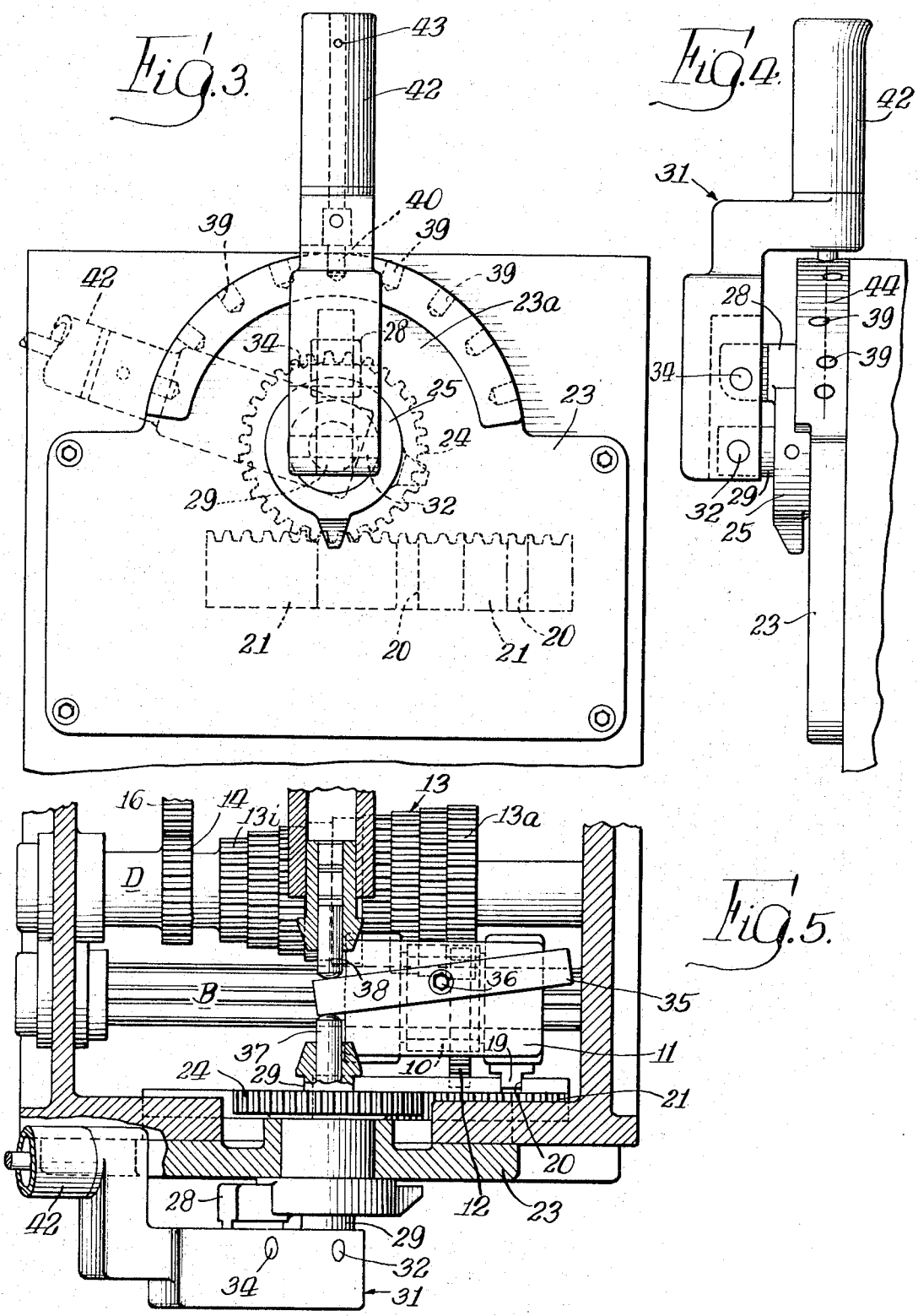

United States Patent Office 3,359,817
Patented Dec. 26, 1967

3,359,817
GEAR CHANGE MECHANISM
Bernard E. Olson, Loves Park, Ill., assignor to Rockford Machine Tool Co., a corporation of Illinois
Filed June 17, 1965, Ser. No. 464,705
7 Claims. (Cl. 74—348)

ABSTRACT OF THE DISCLOSURE

A gear change mechanism, for effecting the selective engagement of a swingable drive gear with one of the gears in a generally conical driven gear assembly, having a single control handle for effecting disengagement and traversal of the drive gear along the gear assembly with a straight cam for moving the drive gear radially inwardly or outwardly during traversal and a detent arrangement for locking the handle in positions of reengagement corresponding to the variations in size of the gears in the gear assembly.

---

This invention relates to a quick change gear mechanism for the headstock of a lathe or the like, It is an object of this invention to provide a new, simple and easily operable single handle control mechanism for shifting the gears of a cone-type gear change mechanism.

It is another object of this invention to provide a single handle control for shifting a gear cluster of a cone-type gear change mechanism, the handle being movable toward and away from a headstock to engage or disengage the gear cluster and having rotary motion for the purpose of shifting the gear cluster along the cone.

It is a further object of this invention to provide a single handle control for shifting a gear cluster of a cone-type gear change mechanism, having a cam bar in the connections between the handle and the gear cluster, the cam bar extending at an angle to the cone gear shaft so that as the handle is rotated to shift the gear cluster longitudinally, the cluster is automatically swung by the cam bar to maintain the gear on the cluster generally uniformly spaced from the gears of the cone gear assembly.

It is still another object of this invention to provide such a means for shifting the gear cluster of a cone-type gear change mechanism, having a pin type plunger secured to the handle and insertable into a plurality of spaced holes so that the handle may be movable in and out to engage and disengage the gear on the cluster to and from the individual gears of the cone gear assembly and retain such engagement by insertion of the pin in a selected hole.

Other features and advantages of the invention will be apparent from the following description taken in conjunction with the accompanying drawings in which:

FIG. 2 is an expanded sectional view along the line 2—2 of FIG. 1 and running generally through the centers of shafts B–C–D–E–F, showing the shiftable cluster gear in engagement with an extreme gear on the cone gear assembly;

FIG. 3 is a front elevation view showing the single control handle in full lines corresponding to the position of the shiftable cluster gear as in FIG. 1 and in dotted lines corresponding to the position of the gear as in FIG. 2;

FIG. 4 is a side elevation view of the feed selector plate and control handle, looking at the right end of FIG. 3; and FIG. 5 is a cutaway plan view taken generally along the line 5—5 of FIG. 1 but showing the shiftable cluster gear in engagement with an extreme gear on the cone gear assembly as in FIG. 2.

Figure 1:
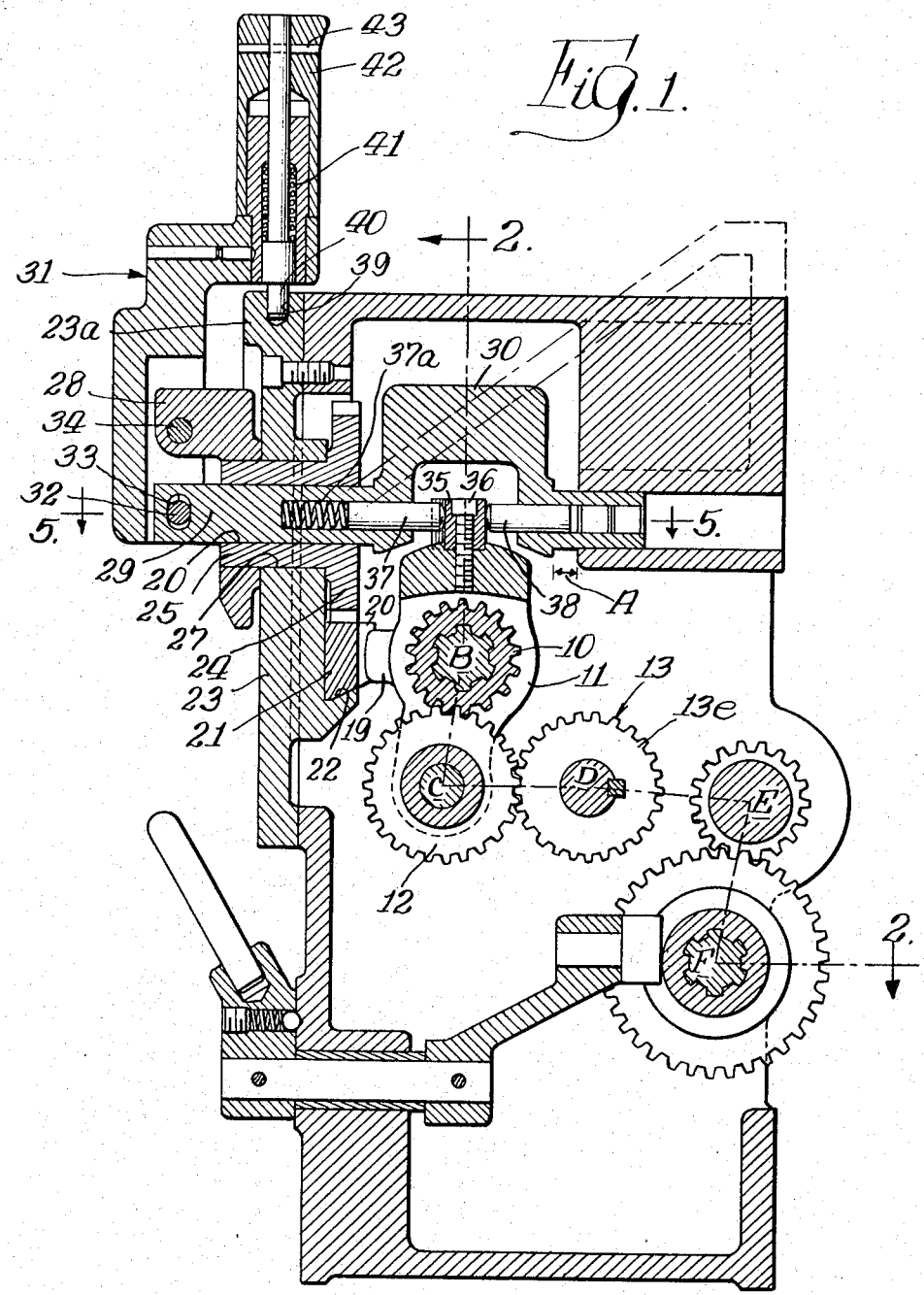
FIG. 1 is a vertical sectional view through the quick change gear mechanism of this invention having a cone gear assembly with a shiftable cluster gear in engagement with one of the central gears of the cone gear assembly.

While an illustrative embodiment of the invention is shown in the drawings and will be described in detail herein, the invention is susceptible of embodiment in different forms, and it should be understood that the present disclosure is to be considered as an exemplification of the principles of the invention and is not intended to limit the invention to the embodiment illustrated. The scope of the invention will be pointed out in the appended claims.

In the preferred form, the invention is embodied in a gear mechanism in a headstock of a lathe or the like, which generally comprises a driving shaft B having a first pinion gear 10 splined thereto. The pinion gear 10 is surrounded by a cluster bracket 11, FIG. 2, for sliding movement therewith along shaft B. The pinion gear 10 is in mesh with a shiftable cluster gear 12 carried on a portion of the cluster bracket extending downwardly from shaft B. The pinion gear 10, bracket 11 and gear 12 form the gear cluster of this invention and is movable longitudinally along a cone gear formation 13. The shiftable cluster gear 12 is swingable with the cluster bracket about shaft B for engagement with anyone of the cone gears 13a through 13i. The cone gear formation is secured about shaft D which is generally parallel to shaft B. Shaft D also carries a gear 14 engaging an appropriate driven gear, such as gear 16 about shaft E. FIG. 2 shows an expanded sectional view running through the shaft centers of FIG. 1. The unique single handle control means of this invention is designed for shifting the cluster bracket 11 and shiftable cluster gear 12 longitudinally along shaft B to present gear 12 to anyone of the gears on the cone gear assembly and to swing gear 12 about the axis of shaft B to engage the gear with anyone of the gears of the cone gear formation.

In order to shift the cluster bracket 11 and cluster gear 12 longitudinally along the cone gear formation, the cluster bracket carries a lug type projection 19 which interengages in a vertical slot 20 on a gear rack 21 which is slidably mounted within the headstock somewhat parallel to the shafts B, C and D. The rack is slidably seated in ways 22 on the inner wall of a feed selector plate 23 so that sliding movement of the rack will shift the gear 12 along the cone gear formation. The rack is engaged by rack actuating pinion 24 which is provided with a cylindrical bearing portion 25 extending through a bore 27 in the feed selector plate 23. The bearing portion extends outwardly from the feed selector plate and a shifter lug 28 is secured thereto by appropriate means to prevent relative rotative movement between the shifter lug and the rack actuating pinion. A shaft 29 of member 30 slidably extends through the pinion 24. A single control handle 31 carries a pin 32 engaging an opening 33 in the slidable shaft 29, and also carries a pivot pin 34 engaging the shifter lug 28. On rotation of the handle about the shaft 29 (in a plane perpendicular to the drawing of FIG. 1) the shifter lug 28 rotates with the handle to rotate the rack actuating pinion 24 to move the gear rack 21 and cluster bracket 11 generally parallel to the cone gear shaft D. FIG. 3 shows, in full lines, the position of the control handle when the shiftable cluster gear is engaged with cone gear 13e as in FIG. 1. The position of the handle shown in dotted lines in FIG. 3 corresponds with the engagement of the shiftable gear as shown in FIGS. 2 and 5.

Since the gears 10 are arranged in a cone formation, it is desirable to transversely swing the shiftable cluster gear 12 about shaft B toward and away from the axis of the cone gear shaft D as the cluster bracket is shifted longitudinally along the cone gears to maintain the cluster gear generally uniformly spaced from the teeth on the gears in the cone gear assembly. To accomplish this, a cam bar 35 (FIGS. 1 and 5) is secured by a bolt 36 to a portion of the cluster bracket extending upwardly from shaft B. The cam bar extends generally longitudinally of the drive shaft B and cone gear axis and at an angle thereto approximately equal to the angle between the cone gear axis and the cone formed by the peripheral ends of the gears on the cone gear assembly. Since the cam bar is above the pivot axis of shaft B and the cone gear is below the pivot axis, the cam bar must extend at an angle which is in an opposite direction to the tapering angle of the cone formed by the cone gear assembly. A pair of cam followers 37 and 38 are provided on the slidable shaft 29. The cam follower 37 is resiliently backed within the shaft by spring 37a while the follower 38 is fixed securely thereto. The purpose of the spring mounted follower 37 will be hereinafter set forth. Thus, as the handle is rotated to shift the cluster bracket along the cone gear formation, the cluster bracket is automatically rotated by the cam bar about shaft B to swing the shiftable cluster gear 12 in a somewhat uniformly spaced path along the gears of the cone gear formation. The angle of the cam bar 35 thus determines the degree of swinging movement of the bracket and cluster gear as the bracket and gear shift longitudinally along the cone gear formation.

Since the cone gears of the cone gear formation are in a stepped formation, and the cam bar 35 is straight, it is necessary to engage or disengage the cluster gear and the selected individual cone gear by providing a swinging motion of the cluster bracket and shiftable gear when in their selected positions. To accomplish this, the feed selector plate 23 is provided with a pie-shaped sector 23a, FIG. 3, having a series of holes 39. As seen best in FIG. 1, the upper portion of the handle is provided with a plunger 40 which is urged by spring 41 into one of the series of holes 39 about the upper circular periphery of the pie-shaped sector of the feed selector plate. The upper portion of the handle is provided with a sleeve 42 which is connected to the plunger by way of pin 43. Upon raising the sleeve of the handle, the plunger compresses a spring 41 and is disengaged from a hole in the feed selector plate to unlock the handle whereupon the handle can be pivoted about pin 34 toward and away from the front wall of the headstock. As the handle is pivoted about pin 34, the shaft 29 and cam followers 37 and 38 are moved transversely to the cone gear assembly to swing the cluster bracket 11 about shaft B to engage or disengage the shiftable gear 12 with the desired gear of the cone gear formation. Since the cone gears of the cone gear formation do not decrease in size uniformly, the holes which receive the plunger are positioned in an uneven or staggered series as seen in FIG. 4. By positioning the holes to the right or left of line 44, FIG. 4, a means is provided to compensate for the variation in the steps of the cone gears of the cone gear formation so that the cluster bracket can be swung to completely engage the shiftable gear 12 with the particular gear of the cone gear assembly.

Since the unique cam bar of this invention provides a substantially constant displacement between the cluster gear 12 and the gears on the cone gear formation, a very short distance of travel by the handle is required during its movement toward and away from the front wall of the headstock to engage and disengage the shiftable gear. The distance designated by arrow A in FIG. 1 illustrates the amount of handle movement. Such a short distance of travel facilitates ease of operation as well as providing a compact control unit.

The steps in operation of the quick change gear mechanism of this invention will now be described. Upon braking the lathe or the like to stop the rotation of the gears, the operator raises the sleeve 42 of the single control handle 31 to disengage the plunger 40 from a hole 39 in the pie-shaped sectors 23a of the feed selector plate 23. Thus the handle can be moved outwardly from the lathe headstock (to the left in FIG. 1) about the pivot pin 34 to slide the shaft 29 and cam followers 37 and 38 slightly to the right to pivot the gear cluster bracket 11 about shaft B and disengage the shiftable gear 12 from a gear on the cone gear formation. The handle can then be rotated in a plane perpendicular to the drawing to shift the gear rack 21 and cluster bracket 11 along the cone gear formations. The cam bar 38 guides the shiftable gear 12 in a swinging motion somewhat uniformly spaced from the gear on the cone gear assembly. When the handle is rotated to an angle which is in line with a particular hole 39 which corresponds to a desired gear on the cone gear formation, the handle may again be pivoted about pin 34 and slide shaft 29 to the left. Cam follower 38 will move the cam bar to the left pivoting the cluster bracket to engage the cluster gear with the selected cone gear. Upon releasing the handle and the sleeve 42, the spring urged plunger 40 is again moved into the selected hole 39 to lock the gears in operable relation.

Thus it can be seen that I have provided a new, simple, and easily operable single handle control for shifting the gear cluster of a cone-type gear change mechanism, the handle being movable in and out to engage or disengage the shiftable cluster gear and having rotary motion to shift the gear along the cone, and having a cam bar in the connections between the handle and the gear cluster to automatically swing the cluster gear in a somewhat constant displacement from the gears on the cone gear assembly.

I claim:

1. A gear change mechanism for the headstock of a lathe or the like comprising: a gear assembly having a generally conical cross section, a second shaft generally parallel to the first shaft, gear cluster means carried on said second shaft for sliding movement longitudinally along said gear assembly, said gear cluster means being swingably mounted on said second shaft, a first gear carried by said cluster means along said second shaft, means for rotating said first gear, a swingable second gear in mesh with said first gear and carried by said cluster means for swinging movement about said second shaft whereby said second gear may be moved into and out of engagement with the gears in said gear assembly, means for moving said cluster means longitudinally along said gear assembly so that said second gear may be aligned with the desired gear in said assembly, cam means responsive to longitudinal movement of said cluster means to swing said second gear about said second shaft at a substantially uniform rate to compensate for major variations in the diameters of the gears in the gear assembly, means for swinging said cluster means about said second shaft to move said second gear into and out of engagement with the gears in the gear assembly, a manually operable control member for controlling both said moving means and said swinging means, said control member being movable in a first direction for controlling said moving means and movable in a second direction for controlling said swinging means, and means for selectively locking said control member in different positions in said second direction for compensating for variations in the diameters of the gears in the gear assembly from the path of the second gear determined by the cam means.

2. A gear change mechanism as defined in claim 1 wherein said cam means includes a straight angle cam surface on said cluster means and a cam follower means engaging said cam surface, said follower means being carried by said swinging means.

3. A gear change mechanism as defined in claim 1 wherein said control member is rotatable in a first plane to effect said first direction control of said moving means, said moving means including a rotatable member pivotally carrying said control member for pivotal movement in said second direction generally perpendicular to said plane, said swinging means including a reciprocating member mounted for movement generally in said second direction and pivotally adjusting one end thereof to said control member, said selectively locking means including aperture means stationary with respect to said control member spaced angularly in said plane about said rotatable member a distance corresponding to the extent of necessary movement of the control member for effecting longitudinal movement of the second gear from one gear to another in said gear assembly and positioned with respect to each other in said second direction to compensate for variations in the diameters of the gears in said gear assembly from the path of the second gear caused by the cam means.

4. A gear change mechanism as defined in claim 1 wherein said control member is rotatable in said first direction to effect control of said moving means and mounted for limited pivotal movement in said second direction to effect control of said swinging means.

5. A gear change mechanism as in claim 1 wherein said means for moving said gear cluster longitudinally along said gear assembly includes a rotatable shaft extending transversely to the axis of said gear assembly; said control member mounted on said last recited shaft for rotating it; and connecting means between said control member and said cluster means to shift said cluster means longitudinally along said gear assembly on rotative movement of said handle and said rotatable shaft, said connecting means including a rack mounted in said casing for movement longitudinally of said gear assembly, gear teeth on said rack, means to interengage said cluster means with said rack, and a pinion gear engaging said rack and mounted on said rotatable shaft.

6. A gear change mechanism as in claim 1 wherein said means for swinging said cluster means about said second shaft to move said second gear into and out of engagement with the gears on said gear assembly comprises said control member mounted for movement toward and away from the second shaft and means connecting said control member with said cluster means, said last named means being movable transversely of said second shaft on movement of said handle toward and away therefrom to swing said cluster means about said shaft to engage or disengage said second gear with the gears in said gear assembly.

7. A gear change mechanism for the headstock of a lathe or the like comprising: a gear assembly having a generally conical cross section, a second shaft generally parallel to the first shaft, gear cluster means carried on said second shaft for sliding movement longitudinally along said gear assembly, said gear cluster means being swingably mounted on said second shaft, a first gear carried by said cluster means along said second shaft, means for rotating said first gear, a swingable second gear in mesh with said first gear and carried by said cluster means for swinging movement about said second shaft whereby said second gear may be moved into and out of engagement with the gears in said gear assembly, means for moving said cluster means longitudinally along said gear assembly so that said second gear may be aligned with the desired gear in said assembly, cam means responsive to longitudinal movement of said cluster means to swing said second gear about said second shaft at a substantially uniform rate to compensate for major variations in the diameters of the gears in the gear assembly, means for swinging said cluster means about said second shaft to move said second gear into and out of engagement with the gears in the gear assembly, a manually operable control member movable in a direction for controlling said swinging means to effect disengagement of said second gear from the gears in said gear assembly, and means for selectively locking said control member in positions of reengagement between said second gear and the gears on said gear assembly, said selectively locking means positioning said control member in different positions of reengagement in said direction to compensate for variations in the diameters of the gears in the gear assembly from the path of the second gear determined by the cam means.

References Cited

UNITED STATES PATENTS

| | | | |
|---|---|---|---|
| 2,662,417 | 12/1953 | Mascherpa | 74—348 |
| 2,743,622 | 5/1956 | Haupt | 74—348 |
| 3,058,365 | 10/1962 | Gerchow | 74—348 |

DONLEY J. STOCKING, *Primary Examiner.*

H. S. LAYTON, *Assistant Examiner.*